US012146672B2

(12) United States Patent
Kitagawa et al.

(10) Patent No.: US 12,146,672 B2
(45) Date of Patent: Nov. 19, 2024

(54) AIR CONDITIONING SYSTEM AND METHOD RECOGNIZING A USER ACTION AND DETERMINING WHETHER A TERMINAL IS REGISTERED TO THE USER

(71) Applicant: DAIKIN INDUSTRIES, LTD., Osaka (JP)

(72) Inventors: Keita Kitagawa, Osaka (JP); Youichi Handa, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 320 days.

(21) Appl. No.: 17/677,905

(22) Filed: Feb. 22, 2022

(65) Prior Publication Data
US 2022/0178570 A1 Jun. 9, 2022

Related U.S. Application Data

(63) Continuation of application No. PCT/JP2020/031650, filed on Aug. 21, 2020.

(30) Foreign Application Priority Data

Aug. 26, 2019 (JP) ................... 2019-153431

(51) Int. Cl.
*F24F 11/50* (2018.01)
*F24F 11/63* (2018.01)
(Continued)

(52) U.S. Cl.
CPC ............ *F24F 11/50* (2018.01); *F24F 11/63* (2018.01); *G05B 15/02* (2013.01); *G06V 40/20* (2022.01);
(Continued)

(58) Field of Classification Search
CPC ...................................... F24F 11/50
See application file for complete search history.

(56) References Cited

U.S. PATENT DOCUMENTS

| 2015/0169062 A1* | 6/2015 | Park ........................ G06F 3/016 |
| | | 345/156 |
| 2016/0217794 A1 | 7/2016 | Imoto et al. |

(Continued)

FOREIGN PATENT DOCUMENTS

| CN | 108088027 A | 5/2018 | |
| CN | 110388694 A * | 10/2019 | ............... A61L 9/18 |

(Continued)

OTHER PUBLICATIONS

International Preliminary Report of corresponding PCT Application No. PCT/JP2020/031650 dated Mar. 10, 2022.

(Continued)

*Primary Examiner* — Suresh Suryawanshi
(74) *Attorney, Agent, or Firm* — Global IP Counselors, LLP

(57) ABSTRACT

An air conditioning system includes an air conditioner, a detector, a transmitter, and a control unit. The air conditioner includes an indoor unit. The detector detects a user action toward the indoor unit. The transmitter transmits first information on the indoor unit to a terminal of the user. The control unit causes the transmitter to transmit the first information to the terminal when the detector detects the user action.

20 Claims, 13 Drawing Sheets

(51) Int. Cl.
*G05B 15/02* (2006.01)
*G06V 40/20* (2022.01)
*G10L 15/22* (2006.01)

(52) U.S. Cl.
CPC ........ *G10L 15/22* (2013.01); *G10L 2015/223* (2013.01)

(56) References Cited

U.S. PATENT DOCUMENTS

| | | |
|---|---|---|
| 2016/0336009 A1 | 11/2016 | Takei et al. |
| 2021/0064334 A1 | 3/2021 | Hidai |
| 2021/0390955 A1 | 12/2021 | Piernot et al. |

FOREIGN PATENT DOCUMENTS

| | | | | |
|---|---|---|---|---|
| JP | 2004-5363 | A | | 1/2004 |
| JP | 2007-78270 | A | | 3/2007 |
| JP | 2012-14394 | A | | 1/2012 |
| JP | 2015020494 | A | * | 2/2015 |
| JP | 2015-55718 | A | | 3/2015 |
| JP | 2015-108464 | A | | 6/2015 |
| JP | 2017-219746 | A | | 12/2017 |
| JP | 2018-136568 | A | | 8/2018 |
| JP | 6425860 | B1 | | 11/2018 |
| JP | 2019-27603 | A | | 2/2019 |
| KR | 20090115586 | A1 | | 11/2009 |
| KR | 20140065590 | A1 | | 5/2014 |
| KR | 20170048815 | A | * | 5/2017 |
| WO | 2015/128960 | A1 | | 9/2015 |
| WO | WO-2016157537 | A1 | * | 10/2016 ............ F24F 11/30 |
| WO | WO-2018211619 | A1 | * | 11/2018 ............ F24F 11/30 |

OTHER PUBLICATIONS

European Search Report of corresponding EP Application No. 20 85 9375.6 dated Sep. 16, 2022.
International Search Report of corresponding PCT Application No. PCT/JP2020/031650 dated Oct. 6, 2020.

* cited by examiner

| USER ID | TERMINAL ID | FACE IMAGE |
|---|---|---|
| aaaaa | 11111 | |
| bbbbb | 22222 | |
| ccccc | 33333 | |

AIR CONDITIONING SYSTEM AND METHOD RECOGNIZING A USER ACTION AND DETERMINING WHETHER A TERMINAL IS REGISTERED TO THE USER

CROSS-REFERENCE TO RELATED APPLICATIONS

This is a continuation of International Application No. PCT/JP2020/031650 filed on Aug. 21, 2020, which claims priority to Japanese Patent Application No. 2019-153431, filed on Aug. 26, 2019. The entire disclosures of these applications are incorporated by reference herein.

BACKGROUND

Field of Invention

The present disclosure relates to an air conditioning system, and an information providing method using the air conditioning system.

Background Information

It has been considered to control equipment such as an air conditioner by means of voice input. Japanese Laid-Open Patent Publication No. 2015-55718 discloses an information processing apparatus configured to determine whether or not a user has viewed a predetermined object in accordance with positional information on a user visual line, and execute voice recognition processing when determined that the user has viewed the predetermined object.

SUMMARY

An air conditioning system in accordance with one aspect includes an air conditioner, a detector, a transmitter, and a control unit. The air conditioner includes an indoor unit. The detector is configured to detect a user action toward the indoor unit. The transmitter is configured to transmit first information on the indoor unit to a terminal of the user. The control unit is configured to cause the transmitter to transmit the first information to the terminal when the detector detects the user action.

An information providing method in accordance with one aspect is usable with an air conditioning system including an air conditioner having an indoor unit, a detector, a transmitter, and a control unit. The detector is disposed adjacent to or in the indoor unit. The transmitter transmits information to a user terminal. The control unit controls the detector and the transmitter. According to the information providing method, the detector contactlessly detects a user action, and the control unit causes the transmitter to transmit information on the indoor unit to the user mobile terminal in accordance with a detection result of the detector.

DETAILED DESCRIPTION OF EMBODIMENT(S)

First Embodiment

Figure 1A:
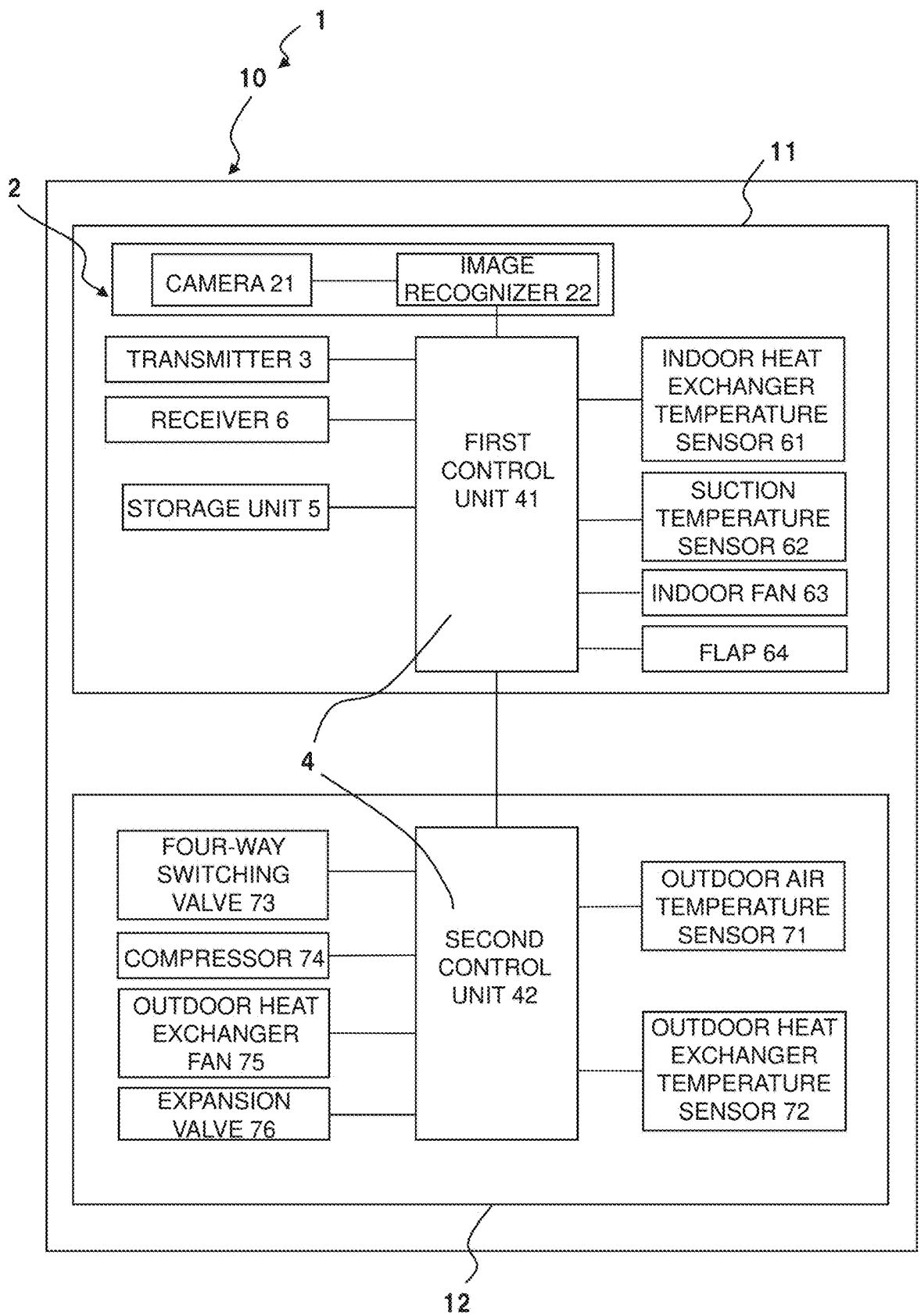
FIG. 1A is a block diagram depicting entire configurations of an air conditioner 10 and an air conditioning system 1 according to a first embodiment.

(1) Configurations of Air Conditioner 10, Air Conditioning System 1, and User Mobile Terminal 9

(1-1) Configuration of Air Conditioner 10 as Air Conditioning System 1

An air conditioning system according to the present embodiment is constituted by an air conditioner 10 including an indoor unit 11 and an outdoor unit 12 as depicted in FIG. 1.

The indoor unit 11 includes a first control unit 41, a detector 2, a transmitter 3, a storage unit 5, a receiver 6, an indoor heat exchanger (not depicted), an indoor fan 63, a flap 64 configured to adjust an airflow direction, an indoor heat exchanger temperature sensor 61, and a suction temperature sensor 62.

The outdoor unit 12 includes an outdoor heat exchanger (not depicted), a four-way switching valve 73, a compressor 74, an outdoor heat exchanger fan 75, an expansion valve 76, a second control unit 42, an outdoor air temperature sensor 71, and an outdoor heat exchanger temperature sensor 72.

The compressor 74, the four-way switching valve 73, the outdoor heat exchanger, the expansion valve 76, and the indoor heat exchanger constitute a refrigerant circuit. The air conditioner 10 conditions air by cooling, heating, or the like of indoor air. The suction temperature sensor 62 measures temperature of the indoor air. The indoor heat exchanger temperature sensor 61 measures temperature of a refrigerant flowing in the indoor heat exchanger. The outdoor air temperature sensor 71 measures outdoor air temperature.

The outdoor heat exchanger temperature sensor 72 measures temperature of a refrigerant flowing in the outdoor heat exchanger.

The first control unit 41 disposed in the indoor unit 11 and the second control unit 42 disposed in the outdoor unit 12 constitute a control unit 4. The first control unit 41 and the second control unit 42 cooperatively control the air conditioner 10. The control unit 4 acquires temperature measurement values from the indoor heat exchanger temperature sensor 61, the suction temperature sensor 62, the outdoor air temperature sensor 71, and the outdoor heat exchanger temperature sensor 72, and controls the indoor fan 63, the flap 64, the four-way switching valve 73, the compressor 74, the outdoor heat exchanger fan 75, the expansion valve 76, and the like.

(1-2) Configuration of Air Conditioning System 1

The air conditioning system 1 according to the first embodiment includes the detector 2, the transmitter 3, the control unit 4, the receiver 6, and the storage unit 5.

The detector 2 detects a user action toward the indoor unit 11. The user action toward the indoor unit 11 corresponds to user notification to the indoor unit 11 of desired operation of the air conditioner 10, and examples thereof include raising a hand, waving a hand, directing a visual line, closing eyes, and talking toward the indoor unit 11 by the user. User action information detected by the detector 2 is transmitted to the control unit 4. The action information includes information on whether or not the user has acted toward the indoor unit, and a recognized user face image.

The detector 2 includes a sensor and a section configured to process information acquired by the sensor. The detector 2 according to the present embodiment includes a camera 21 and an image recognizer 22. The image recognizer 22 is a CPU or a microcomputer communicably connected to the first control unit 41 and the camera 21.

The camera 21 captures an image in a room equipped with the indoor unit 11. The image captured by the camera 21 is transmitted to the image recognizer 22. The image recognizer 22 analyzes the image to recognize the user action. The image recognizer 22 exemplarily analyzes the image to determine whether or not the user has raised or waved a hand toward the indoor unit 11. The image recognizer 22 analyzes the image to further extract a user face image. These image analyses may be conducted in accordance with a machine learning method or the like.

The first control unit 41 is a computer including a CPU and a memory, and controls the detector 2, the transmitter 3, the receiver 6, and the storage unit 5.

Figures 1B, 2:
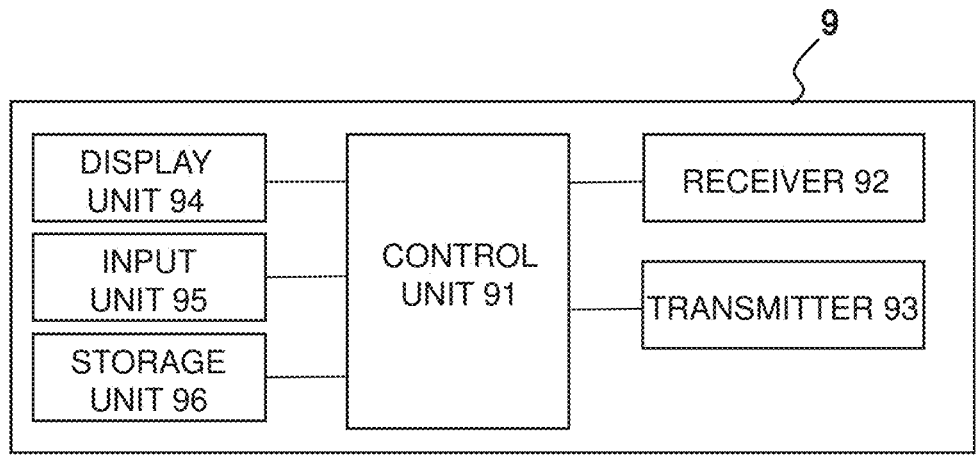
FIG. 1B is a block diagram depicting a configuration of a mobile terminal 9 according to the first embodiment.
FIG. 2 is a chart indicating a user information database.

As depicted in FIG. 2, the storage unit 5 stores, as a registered user information database, user information utilized by the air conditioning system 1. The user information database includes a user ID (identification information) of each user, an ID of a user mobile terminal 9, and a user face image. The user information database may further include a mail address of the user.

The transmitter 3 transmits first information on the indoor unit 11 to the user mobile terminal 9 under control of the control unit 4. The first information includes information for running the air conditioner 10 (indoor unit 11) and/or information for operation of the air conditioner 10 (indoor unit 11). The information for operation of the air conditioner 10 (indoor unit 11) includes a URL indicating an address on a network enabling operation of the indoor unit 11 with use of the mobile terminal 9, and/or information for guiding to an operation screen of the air conditioner through push notification.

The receiver 6 receives operation information on the air conditioner 10 transmitted from the user mobile terminal 9. The receiver 6 transmits the operation information to the first control unit 41. The first control unit 41 controls, appropriately in cooperation with the second control unit 42, the indoor unit 11 and the outdoor unit 12 in accordance with the operation information received by the receiver 6. The receiver 6 may alternatively be provided in common with the transmitter 3.

Wireless communication between the air conditioning system 1 and the user mobile terminal 9 is conducted in accordance with an appropriately adoptable wireless communication mode. Adoptable examples of a standardized wireless communication mode include a short-range wireless communication mode such as Bluetooth (registered trademark) and various wireless local area network (LAN) communication modes provided as IEEE802.11.

(1-3) User Mobile Terminal 9

The user mobile terminal 9 according to the present example is a smartphone or the like. Examples of a terminal configured to communicate with the air conditioning system 1 may include a tablet terminal and a notebook computer. The user mobile terminal 9 installing application software or utilizing a browser can be adopted as a remote controller for a user operating the air conditioner 10.

As depicted in FIG. 1B, the mobile terminal 9 includes a control unit 91, a receiver 92, a transmitter 93, a display unit 94, an input unit 95, and a storage unit 96.

The control unit 91 of the mobile terminal 9 is a computer including a CPU and a memory. The control unit 91 controls the receiver 92, the transmitter 93, the display unit 94, the input unit 95, and the storage unit 96. The display unit 94 is constituted by a touch panel, and also functions as the input unit 95.

The receiver 92 of the mobile terminal 9 receives the first information on the air conditioner 10 (indoor unit 11) from the transmitter 3 of the air conditioning system 1.

Figure 9:
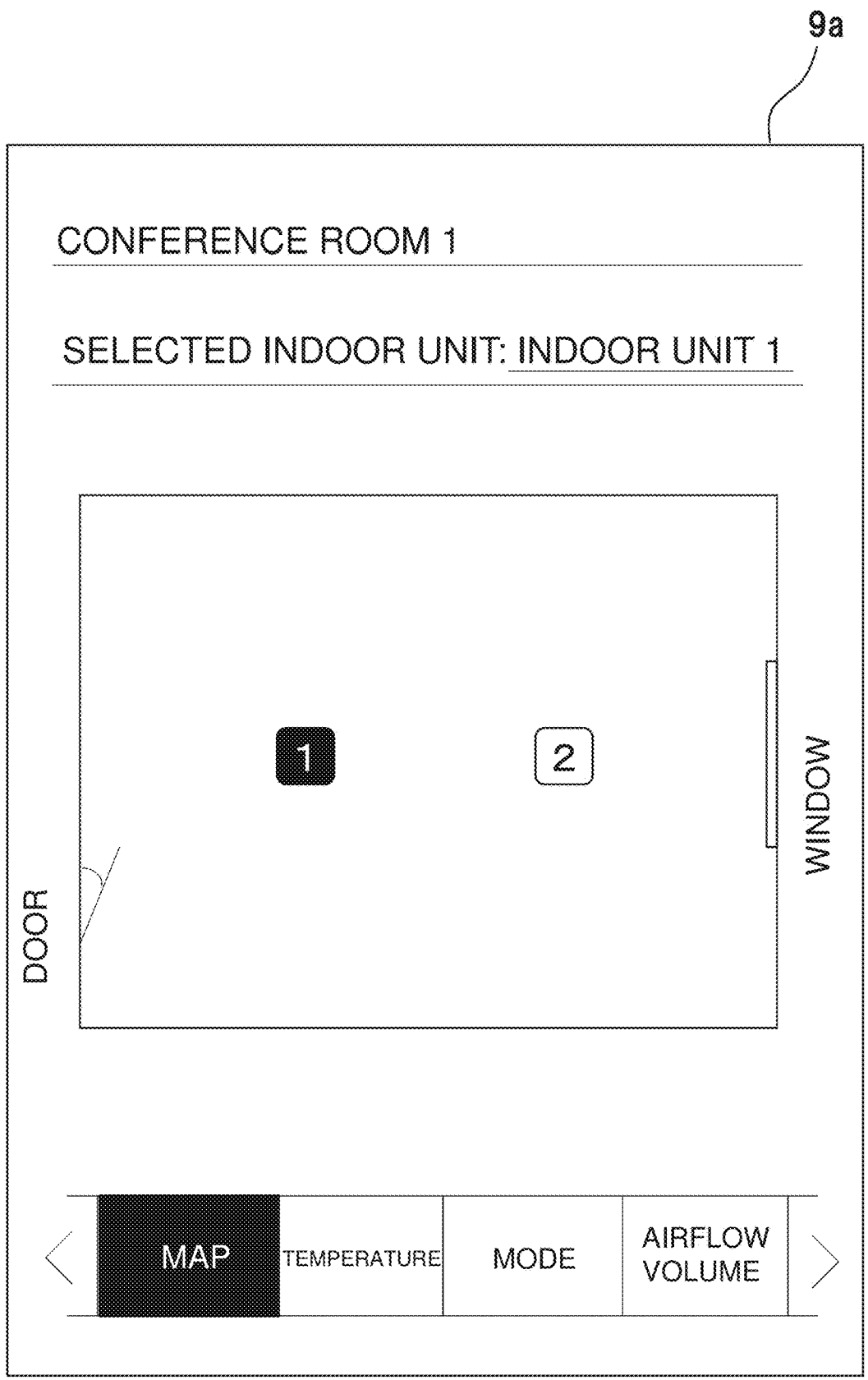
FIG. 9 is a view of an operation screen of the air conditioner 10 displayed on a display screen 9a of the mobile terminal 9.
Figure 10:
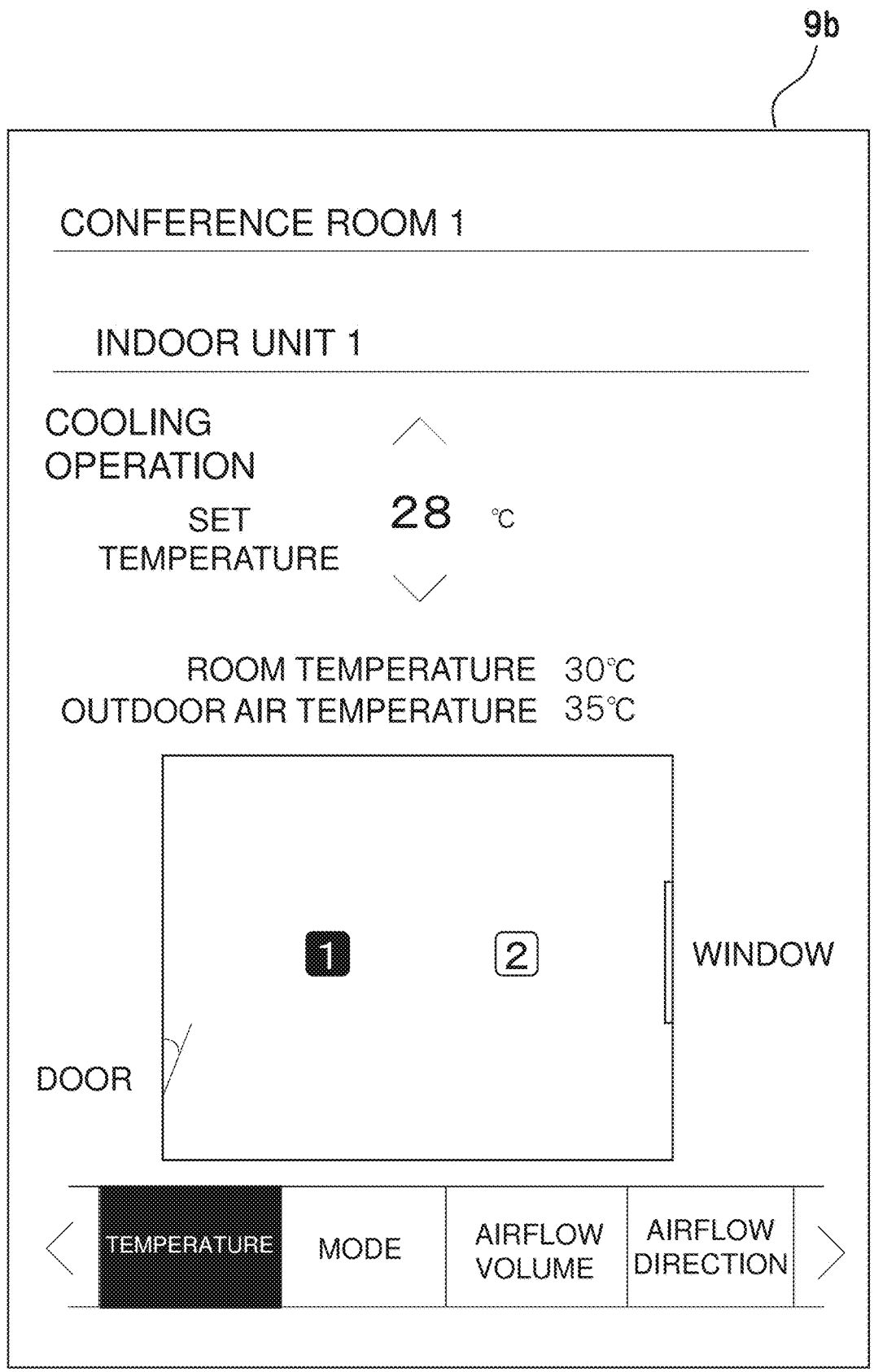
FIG. 10 is a view of another operation screen of the air conditioner 10 displayed on a display screen 9b of the mobile terminal 9.

The display unit 94 of the mobile terminal 9 displays the first information received by the receiver 92, Described with reference to FIG. 9 and FIG. 10 are display screens 9a and 9b on the display unit 94 (and the input unit 95).

FIG. 9 has an uppermost section including description of "conference room 1" indicating an air conditioning target space. The section of "conference room 1" is provided therebelow with a line including "selected indoor unit: indoor unit 1". This state indicates that a first indoor unit 11a is currently selected.

The display screen 9a in FIG. 9 serves as an indoor unit selection screen. The display screen 9a has a center section displaying an indoor map. The center section indicates disposition of the first indoor unit 11a (denoted by "1") and a second indoor unit 11b (denoted by "2") in this room. FIG. 9 depicts the first indoor unit "1" being selected, and the first indoor unit "1" is reversely displayed on the map. In FIG. 9, selection can be switched by touching an icon of each indoor unit.

The display screen 9a in FIG. 9 has a bottom section serving as a display screen selector. Specifically, the bottom section includes a bar including displays of "map", "temperature", "mode", "airflow volume", and the like. In FIG. 9, "map" is reversely displayed, indicating that the indoor unit selection screen is selected. This display screen selector includes the displays that can be scrolled by touching arrows on the left and right. The display screen is changed by touching display of a desired screen.

Tapping "temperature" in the display screen selector on the display screen 9a in FIG. 9 leads to display of a temperature setting screen depicted in FIG. 10.

FIG. 10 has an uppermost section including description of "conference room 1" indicating the air conditioning target space as in FIG. 9. The section of "conference room 1" is provided therebelow with a line including "indoor unit 1". This state indicates that an operation screen for the first indoor unit 11a is currently displayed. The section of "indoor unit 1" is provided therebelow with display of "cooling operation". The display of "cooling operation" indicates an operating mode of the first indoor unit 11a. Examples of the operating mode include cooling operation, heating operation, dehumidifying operation, and the like. The display of "cooling operation" indicates an operating state of the first indoor unit 11a.

The display screen has a center section displaying "set temperature 28° C.". This state indicates that indoor set temperature is currently 28° C. The set temperature can be changed by the user operating the display screen 9b of the mobile terminal 9. In FIG. 10, the set temperature can be increased or decreased by touching arrows above and below display of "28". Display of "set temperature 28° C." mainly provides information for operation of the first indoor unit 11a.

The display of "set temperature 28° C." is provided therebelow with displays of "room temperature 30° C." and "outdoor air temperature 35° C.". These displays indicate measurement values of the temperature sensors disposed at the indoor unit 11 and the outdoor unit of the air conditioner 10. The displays of "room temperature 30° C." and "outdoor air temperature 35° C." indicate the operating state of the first indoor unit 11a. The display of "outdoor air temperature 35° C." is provided therebelow with a map same as that in FIG. 9, also indicating that the first indoor unit 11a is selected.

The display screen 9b in FIG. 10 has a lowermost section serving as a display screen selector as in FIG. 9. FIG. 10 includes "temperature" reversely displayed, indicating the temperature setting screen.

The application software for utilization of the air conditioner 10 (indoor unit 11) is preliminarily downloaded from a server to the mobile terminal 9 and is stored in the storage unit 96 of the mobile terminal 9 in an executable state. The application software is provided by a manufacturer or a seller of the air conditioner 10, and is downloadably saved on the server.

When the application software is installed in the mobile terminal 9, the user information (the user ID, the ID of the mobile terminal, and the face image) is registered on the user information database in the storage unit 5 of the air conditioning system 1. The user information database can be registered in the storage unit 5 through direct communication between the mobile terminal 9 and the indoor unit 11, or the user information database may be registered on the server and may be provided from the server to the indoor unit 11.

(2) Method of Providing Information on Air Conditioner 10 by Means of Air Conditioning System 1

Figure 3:
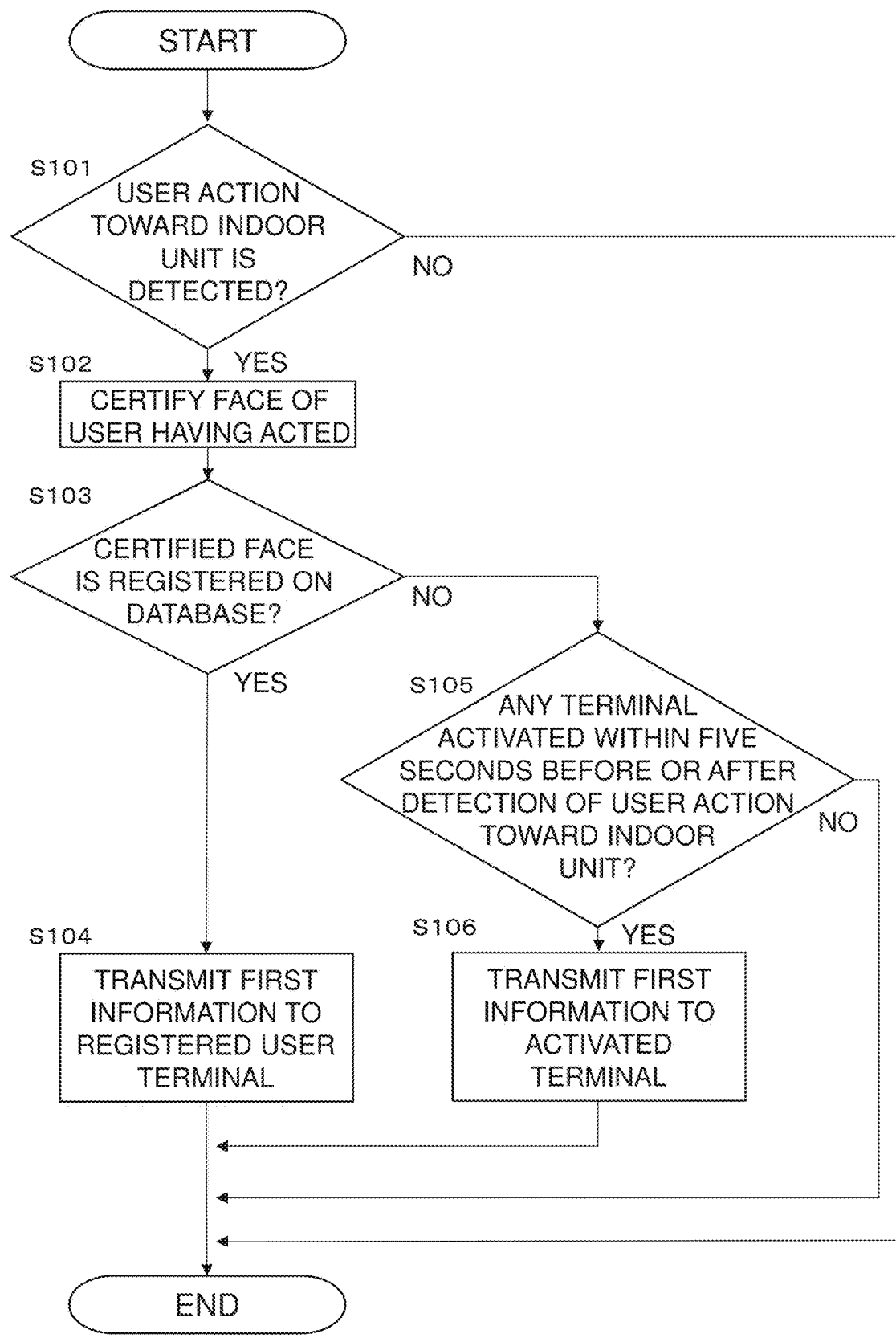
FIG. 3 is an explanatory flowchart of a method of providing information on the air conditioner 10 according to the first embodiment.
Figure 4:
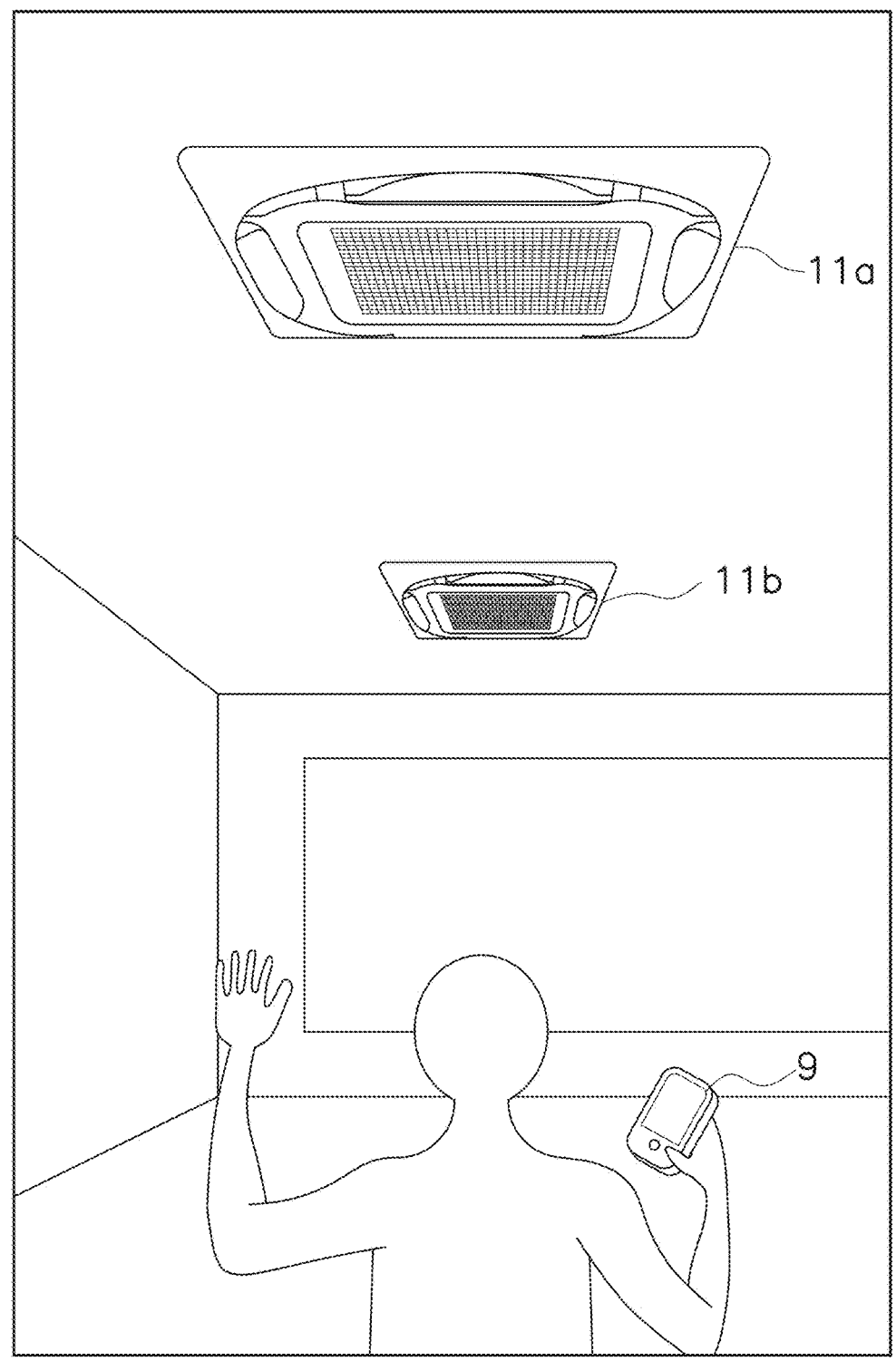
FIG. 4 is an explanatory view of an exemplary user action toward an indoor unit in the first embodiment.

A method of providing information on the air conditioner 10 (indoor unit 11) by means of the air conditioning system 1 will be described with reference to a flowchart in FIG. 3, an explanatory view of a user action in FIG. 4, and a room layout view in FIG. 5.

Figure 5:
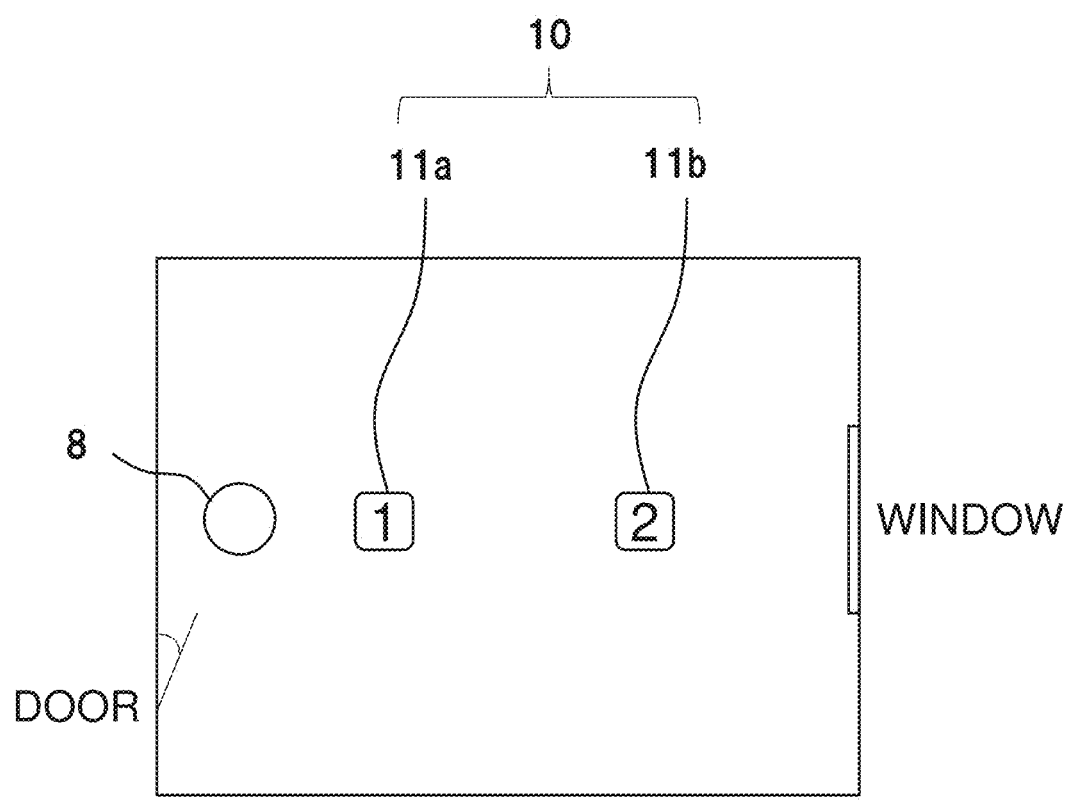
FIG. 5 is an explanatory view of disposition of a first indoor unit 11a and a second indoor unit 11b and a user position in a conference room 1.

As depicted in FIG. 5, assume that a user 8 is in the conference room 1 provided with the two indoor units 11a and 11b of the air conditioner 10. The first indoor unit 11a and the second indoor unit 11b are connected to the identical outdoor unit 12. As depicted in FIG. 5, assume that the user 8 is positioned more adjacent to the indoor unit 11a rather than the indoor unit 11b.

In step S101, the detector 2 detects a user action toward the indoor unit 11a. In this case, as depicted in FIG. 4, the detector 2 detects a user action of being directed to the indoor unit 11a and raising a hand toward the indoor unit 11a.

Specifically, the camera 21 captures an indoor image. The image may be a still image or a moving image. The image thus captured is transmitted to the image recognizer 22. The image recognizer 22 analyzes the image thus received to recognize the action of the user 8. The image recognizer 22 determines whether or not the user 8 has raised the hand toward the indoor unit. When the user has raised the hand toward the indoor unit 11a, the flow proceeds to step S102. A user action of raising a hand without being directed to the indoor unit 11a is not detected as an action toward the indoor unit 11a. The flow ends when there is detected no action toward the indoor unit 11a.

In step S102, the image recognizer 22 certifies a face of the user having executed the action.

Subsequently in step S103, the first control unit 41 receives a user face image thus certified from the image recognizer 22, and determines whether or not the user face image is registered on the user information database in the storage unit 5. The flow proceeds to step S104 when the user face image is registered.

In step S104, the first control unit 41 commands the transmitter 3 to transmit the first information to the mobile terminal 9 of the registered user.

When the user face image certified by the image recognizer 22 is not registered on the user information database in the storage unit 5 in step S103, the flow proceeds to step S105.

In step S105, the first control unit 41 checks whether or not there is nearby the mobile terminal 9 activated within five seconds before or after detection of the user action toward the indoor unit 11. A state where the mobile terminal 9 is activated indicates a state where the mobile terminal 9 is unlocked and becomes communicable in a wireless communication mode such as Bluetooth (registered trademark) or any one of the various wireless local area network (LAN) communication modes provided as IEEE802.11. The first control unit 41 may exemplarily adopt a beacon (a position specifying technique adopting a short-range wireless communication technique) in order to search for the mobile terminal 9 nearby, Examples of the beacon include a Bluetooth (registered trademark) beacon.

When there is nearby the activated mobile terminal 9 in step S105, the first information is transmitted to the mobile terminal 9 (S106). When there is nearby no activated mobile terminal 9 in step S105, control simply ends.

(3) Characteristics 3-1

The air conditioning system 1 according to the present embodiment includes the indoor unit 11, the detector 2, the transmitter 3, and the control unit 4. The detector 2 detects a user action toward the indoor unit 11. The transmitter 3 transmits the first information on the air conditioner 10 (indoor unit 11) to the mobile terminal 9 of the user 8. The first information includes information for running the air conditioner 10 (indoor unit 11) and/or information for operation of the air conditioner 10 (indoor unit 11). When the detector 2 detects the action of the user 8, the control unit 4 causes the transmitter 3 to transmit the first information to the user mobile terminal 9.

Adoption of the air conditioning system 1 according to the present embodiment allows the user to receive the first information on the air conditioner 10 (indoor unit 11) with the simple action.

3-2

The information for operation of the air conditioner 10 (indoor unit 11) includes a URL indicating an address on a network enabling operation of the indoor unit 11 with use of the mobile terminal 9, and/or information for guiding to an operation screen of the air conditioner through push notification.

3-3

The detector 2 according to the present embodiment includes the camera 21 and the image recognizer 22.

The camera 21 captures an indoor image. The image thus captured is transmitted to the image recognizer. The image recognizer 22 identifies the user action in the user image.

The air conditioning system 1 according to the present embodiment recognizes user movement as an action, so that the user does not need to emit voice.

The image recognizer 22 further certifies the user face image in the captured image. The face image thus certified is compared with the user face image registered in the storage unit 5 for checking whether or not the user information is registered. Accordingly, the first information can be transmitted more exactly to the user desired to operate the indoor unit 11.

(4) Modification Examples

(4-1) Modification Example 1A

Figure 6A:
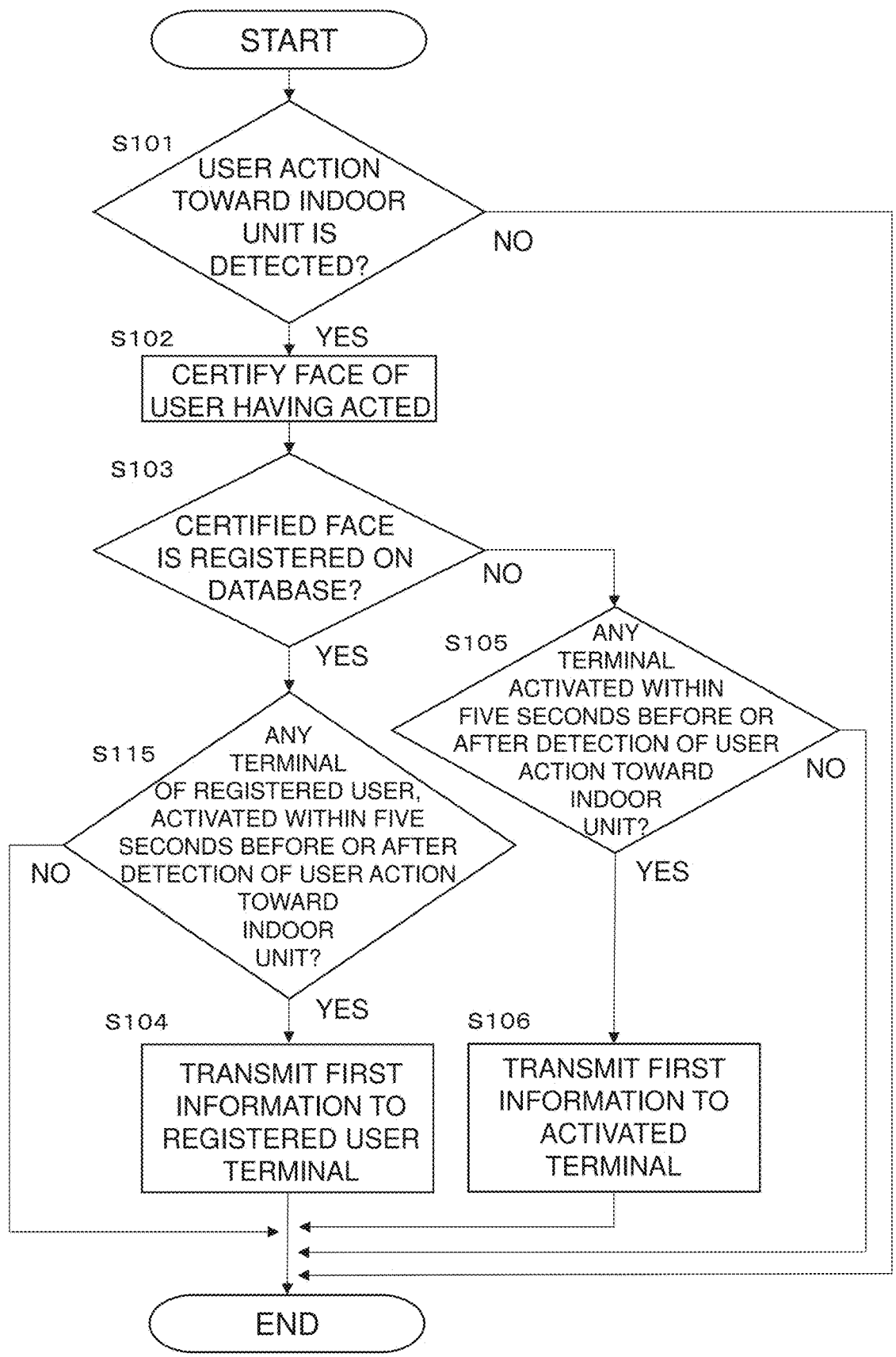
FIG. 6A is an explanatory flowchart of a method of providing information on an air conditioner 10 according to a modification example 1A.

As depicted in FIG. 1A, an air conditioner 10 and an air conditioning system 1 according to the modification example 1A are configured similarly to those according to the first embodiment. A method of providing information on the air conditioner 10 by means of the air conditioning system 1 according to the modification example 1A is depicted in a flowchart of FIG. 6A. The flow until step S103 in the information providing method according to the modification example 1A is same as that according to the first embodiment. The flow is same as that according to the first embodiment also when the certified face is not registered in the storage unit 5 in step S103. According to the modification example 1A, the flow proceeds to step S115 when the certified face is registered in the storage unit 5 in step S103. In step S115, the first control unit 41 checks whether or not the indoor unit 11 is provided therearound with any mobile terminal of the registered user, which is activated within five seconds before or after detection of the user action toward the indoor unit. When there is the activated mobile terminal 9 of the registered user in step S115, the first information is transmitted to the mobile terminal 9 of the registered user (S104). When there is nearby no activated mobile terminal 9 of the registered user in step S115, control ends.

(4-2) Modification Example 1B

Figure 6B:
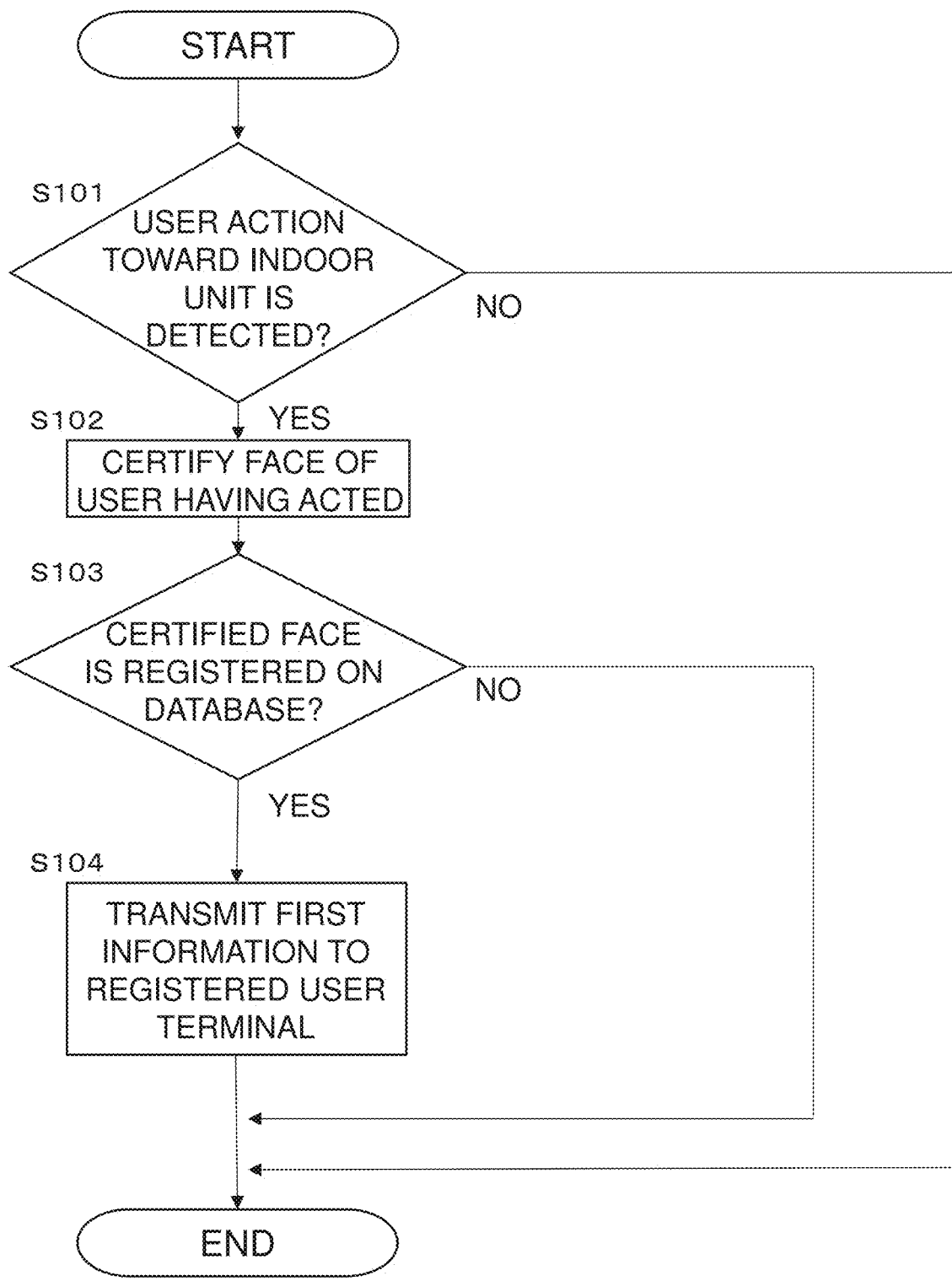
FIG. 6B is an explanatory flowchart of a method of providing information on an air conditioner 10 according to a modification example 1B.

As depicted in FIG. 1A, an air conditioner 10 and an air conditioning system 1 according to the modification example 1B are configured similarly to those according to the first embodiment. A method of providing information on the air conditioner 10 by means of the air conditioning system 1 according to the modification example 1B is depicted in a flowchart of FIG. 6B. The flow until step S103 in the information providing method according to the modification example 1B is same as that according to the first embodiment. According to the first embodiment, when the certified face is not registered in the storage unit 5 in step S103, the flow further proceeds to step S105 and the first control unit 41 checks whether or not the indoor unit 11 is provided therearound with any mobile terminal activated within five seconds before or after detection of the user action toward the indoor unit. According to the modification example 1B, the flow simply ends when the certified face is not registered in the storage unit 5 in step S103.

(4-3) Modification Example 1C

Figure 7:
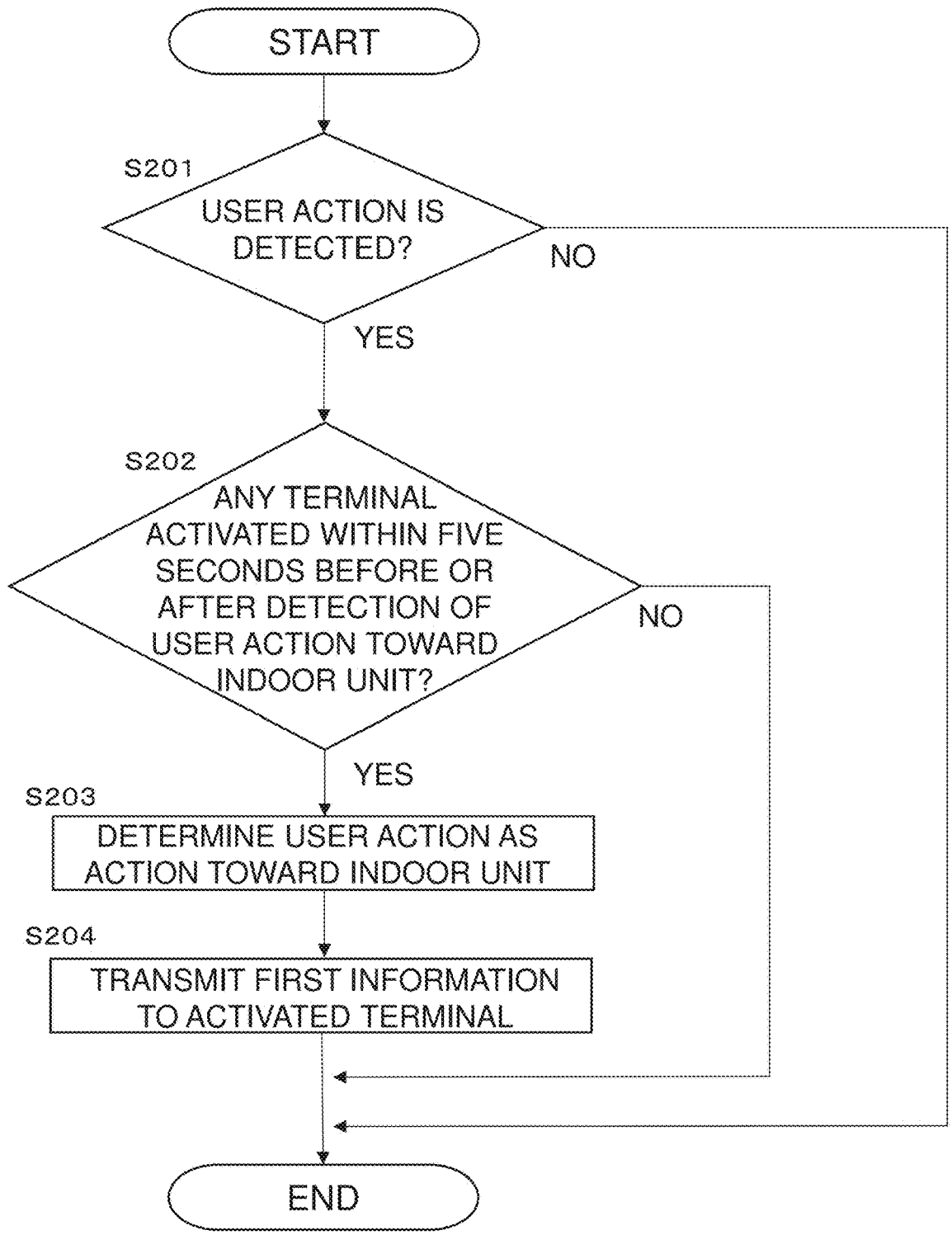
FIG. 7 is an explanatory flowchart of a method of providing information on an air conditioner 10 according to a modification example 1C.

According to the first embodiment, whether or not the user action is executed toward the indoor unit 11 is determined with use of the image captured by the camera 21. According to the modification example 1C, when the mobile terminal 9 is turned ON before or after detection of the user action, the user action is determined as being executed toward the indoor unit. Details are described with reference to a flowchart in FIG. 7.

In step S201, the detector 2 detects a user action. In this case, as depicted in FIG. 4, the detector 2 detects a user action of raising a hand toward the indoor unit 11a.

Specifically, the camera 21 captures an indoor image. The image may be a still image or a moving image. The image thus captured is transmitted to the image recognizer 22. The image recognizer 22 analyzes the image thus received to recognize the action of the user 8. The image recognizer 22 determines whether or not the user 8 has raised the hand toward the indoor unit. When it is determined that the user has raised the hand toward the indoor unit 11, the flow proceeds to step 202. When it is not determined that the user has raised the hand toward the indoor unit 11, the flow ends.

In step S202, the first control unit 41 receives, from the image recognizer 22, information indicating that the user has acted, and checks whether or not there is nearby the mobile terminal 9 activated within five seconds before or after detection of the user action toward the indoor unit 11a. The first control unit 41 may exemplarily adopt a beacon (a position specifying technique adopting a short-range wireless communication technique) in order to search for the mobile terminal 9 nearby. When there is nearby the activated mobile terminal 9, the flow proceeds to step S203. When there is nearby no activated mobile terminal 9, the flow ends.

In step S203, the first control unit 41 determines that the user action is executed toward the indoor unit 11a, and transmits the first information to the activated mobile terminal 9 (S204).

In the air conditioning system 1 according to the modification example 1C, the user can receive the first information on the air conditioner 10 (indoor unit 11) even in a case where the user information is not preliminarily registered in the storage unit 5.

(4-4) Modification Example 1D

Figure 8:
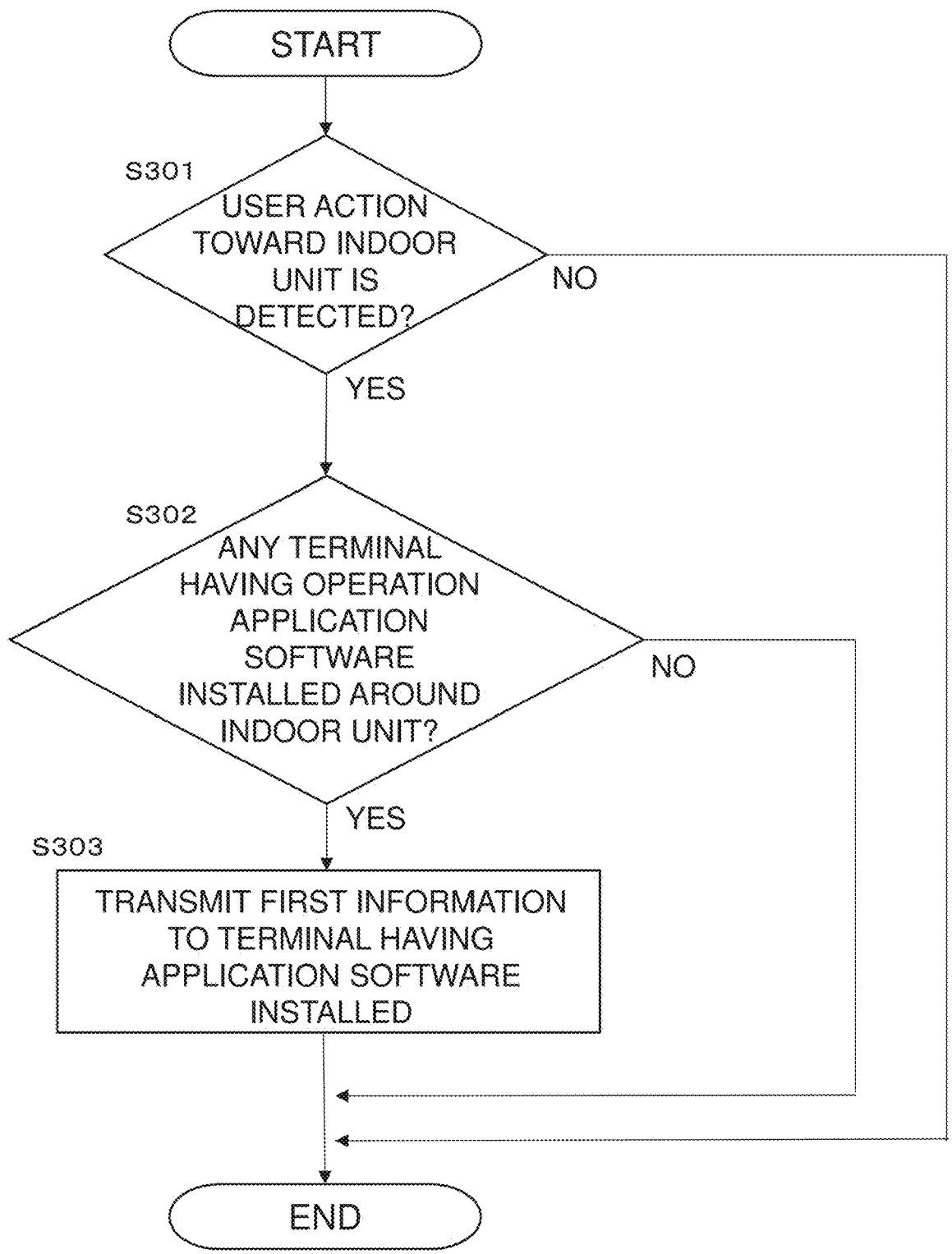
FIG. 8 is an explanatory flowchart of a method of providing information on an air conditioner 10 according to a modification example 1D.

According to the modification example 1C, step S202 relates to the search as to whether or not there is any activated mobile terminal before or after the user action. According to the modification example 1D, step S202 is replaced with searching for any nearby terminal having installed application software upon detection of the user action. An information providing method according to the modification example ID is described with reference to a flowchart in FIG. 8.

In step S301, the detector 2 detects a user action toward the indoor unit. In this case, as depicted in FIG. 4, the detector 2 detects a user action of raising a hand toward the indoor unit 11*a*.

Specifically, the camera 21 captures an indoor image. The image may be a still image or a moving image. The image thus captured is transmitted to the image recognizer 22. The image recognizer 22 analyzes the image thus received to recognize the action of the user 8. The image recognizer 22 determines whether or not the user 8 has raised the hand toward the indoor unit. When it is determined that the user has raised the hand toward the indoor unit 11, the flow proceeds to step S302. When it is not determined that the user has raised the hand toward the indoor unit 11, the flow ends.

In step S302, the first control unit 41 receives, from the image recognizer 22, information indicating that the user has acted toward the indoor unit, and checks whether or not the indoor unit 11*a* is provided therearound with the mobile terminal 9 having operation application software installed. The first control unit 41 may exemplarily adopt a beacon (a position specifying technique adopting a short-range wireless communication technique) in order to search for the mobile terminal 9 nearby. When there is nearby the mobile terminal 9 having the operation application software installed, the flow proceeds to step S303. When there is nearby no mobile terminal 9 having the operation application software installed, control ends.

In step S303, the first control unit 41 transmits the first information to the mobile terminal 9 having the operation application software installed.

In the air conditioning system 1 according to the modification example 1D, the user can receive the first information on the air conditioner 10 (indoor unit 11) even in a case where the user information is not preliminarily registered in the storage unit 5.

(4-5) Modification Example 1E

The user action according to the first embodiment relates to raising the hand. The user action is not limited thereto. A user action according to the modification example IF relates to watching the indoor unit 11*a*. The image recognizer 22 analyzes a visual line in the user face image to determine whether or not the user has watched the indoor unit 11*a*. The remaining features other than the user action and detection by the detector 2 are similar to those according to the first embodiment.

The user can receive the information on the indoor unit by simply moving the visual line more easily than raising a hand.

(4-6) Modification Example 1F

Figure 11:
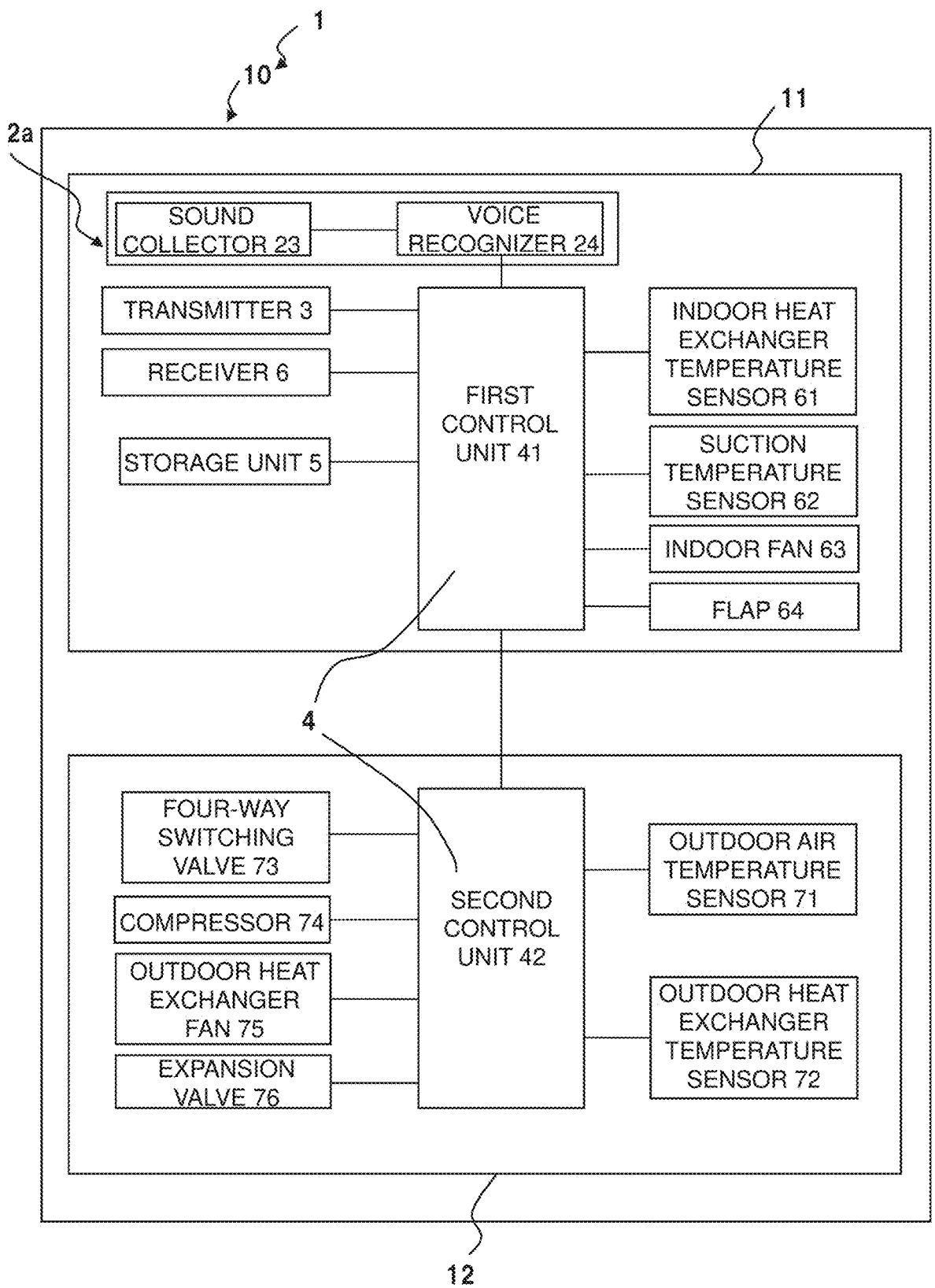
FIG. 11 is a block diagram depicting entire configurations of an air conditioner 10 and an air conditioning system 1 according to a modification example 1F.

The user action according to the first embodiment relates to raising the hand. The detector 2 includes the camera 21 and the image recognizer 22. A user action according to the modification example 1F relates to emitting voice. As depicted in FIG. 11, the modification example 1F provides a detector 2*a* including a sound collector 23 and a voice recognizer 24. The user emits words "I want to operate the air conditioner" or the like toward the indoor unit 11*a*. The sound collector 23 collects such voice, and the voice recognizer 24 recognizes the voice and determines whether or not the voice corresponds to an action toward the indoor unit. The remaining configurations are similar to those according to the first embodiment.

(4-7) Modification Example 1G

According to the modification example 1G, the user can operate the first indoor unit 11*a* to which the action is directed, as well as the second indoor unit 11*b* different from the first indoor unit 11*a*, as described on the display screens 9*a* and 9*b* in FIG. 9 and FIG. 10.

According to the modification example 1G, the user having acted can operate the air conditioner 10 with use of the mobile terminal 9 as a remote controller.

(4-8) Modification Example 1H

According to the modification example 1G, the user can control the second indoor unit 11*b* equally to the first indoor unit 11*a* to which the action is directed. According to the modification example 1H, the user has limited authority to control the second indoor unit 11*b*. Specifically exemplarily, the user can change setting of air conditioning temperature of the second indoor unit 11*b*, but cannot change setting of the airflow volume or the airflow direction. Such limited authority can prevent a user positioned distant from the indoor unit from excessively controlling setting of the indoor unit installed at a distant position.

(4-9) Modification Example 1I

In step S105 according to the first embodiment, the air conditioning system 1 detects a nearby mobile terminal by means of the Bluetooth (registered trademark) beacon and transmits the first information to the mobile terminal. According to the modification example 1I, the air conditioning system 1 transmits and receives a beacon signal to and from the mobile terminal 9 and estimates a distance between the air conditioning system 1 and the mobile terminal 9 in accordance with radio field intensity. The air conditioning system 1 transmits the first information only to the mobile terminal estimated to have an appropriate distance to the user. The air conditioning system 1 simply assumes the mobile terminal estimated to be closest as the user mobile terminal.

(4-10) Modification Example 1J

According to the first embodiment, the user preliminarily installs, in the mobile terminal 9, the application software for operation of the indoor unit 11. It is not essential to install in the mobile terminal 9 specific application software for operation of the indoor unit.

The flow until step S103 in an information providing method according to the modification example 1J is same as that according to the first embodiment. According to the modification example 1J, upon transmission of the first information to the user mobile terminal 9 in step S104, the first control unit 41 pushes a link to a web page for operation of the indoor unit 11, to the mobile terminal 9 having the mobile terminal ID corresponding to the user ID. The user clicks the link to enable operation of the indoor unit 11 with use of the browser.

(4-11) Modification Example 1K

As depicted in FIG. 2, the user information database according to the first embodiment includes the user ID, the terminal ID, and the user face image registered for each user. The modification example 1K provides further registration of a user mail address.

According to the modification example 1J, the air conditioning system 1 transmits, directly to the user mobile terminal 9, the push to the web page for operation of the indoor unit 11. According to the modification example 1K, the link to the web page for operation of the indoor unit 11 is transmitted by email to the registered user mail address.

(4-12) Modification Example 1L

According to the first embodiment, the two indoor units 11a and 11b disposed in one room are connected to the identical outdoor unit 12. According to the modification example 1L, the two indoor units 11a and 11b belong to independent refrigerant circuits. The indoor units 11a and 11b are connected to outdoor units 12 provided separately from each other. The remaining configurations are similar to those according to the first embodiment.

Also in accordance with the modification example 1L, the two indoor units 11a and 11b can be managed with use of the common application software to achieve integral operation.

(4-13) Modification Example 1M

According to the first embodiment, the two indoor units are disposed in one room. The number of the indoor units is not limited to this case, and there may alternatively be provided one, or three or more indoor units. The modification example 1M provides six indoor units.

Also in accordance with the modification example 1M, the six indoor units can be managed with use of the common application software to achieve integral operation. As in the modification example 1G, any indoor unit other than the indoor unit corresponding to the detector having detected the user action may have user operation limitation.

(4-14) Modification Example 1N

According to the first embodiment, the image recognizer 22 is the CPU or the microcomputer communicably connected to the first control unit 41 and the camera 21. The image recognizer 22 may alternatively be provided in the first control unit 41. In this case, the image captured by the camera is transmitted to the first control unit 41 that recognizes the user action and the user face. The image recognizer 22 may further alternatively be provided in a CPU of the camera 21.

(4-15) Modification Example 1O

Figure 12:
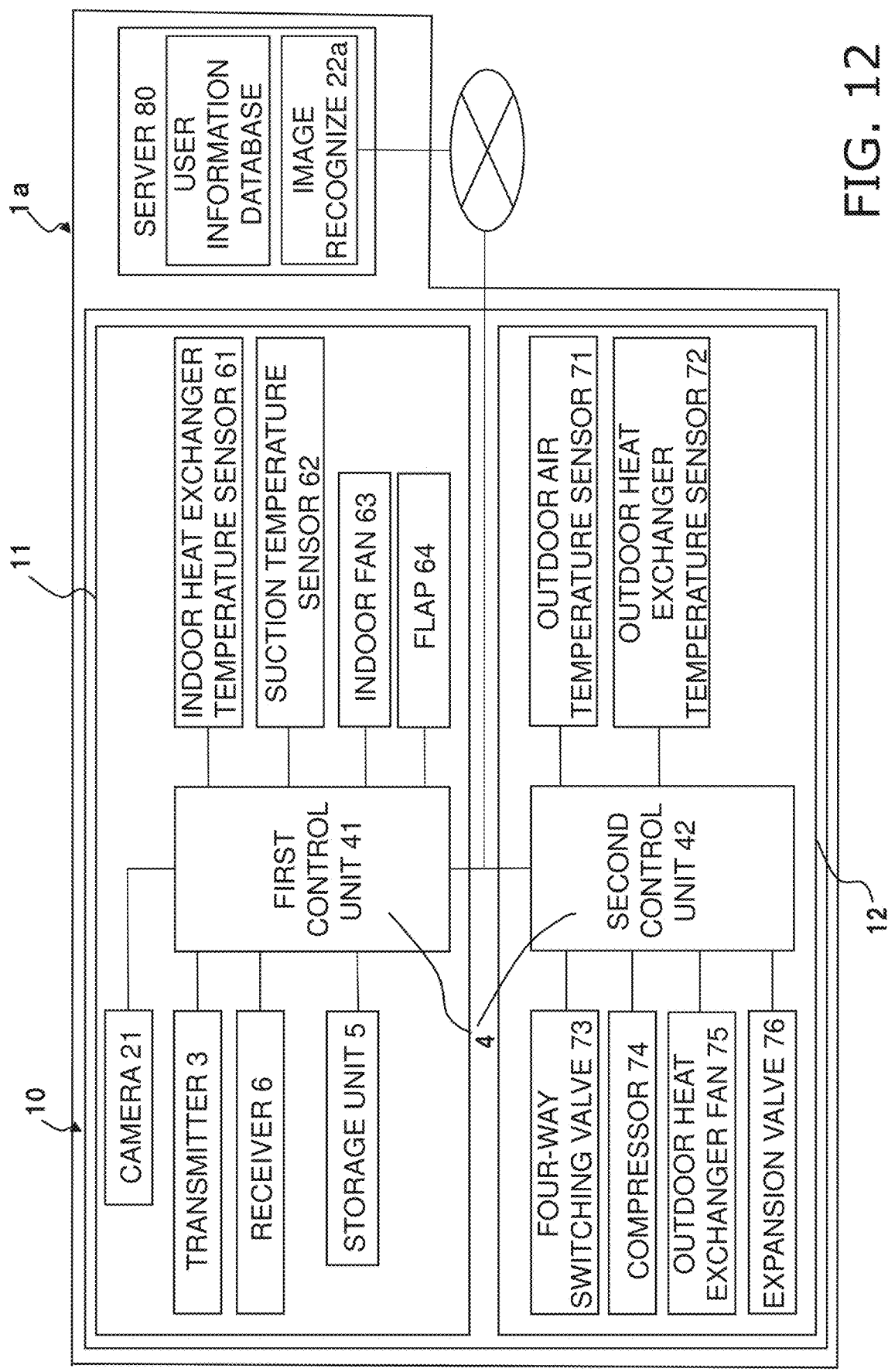
FIG. 12 is a block diagram depicting an entire configuration of an air conditioning system 1a according to a modification example 1O.

As depicted in FIG. 12, the modification example 1O provides an air conditioning system 1a including, in addition to the constituents of the air conditioning system 1 according to the first embodiment, a server 80 connected to the air conditioner 10 via a network. According to the first embodiment, the user information database is registered in the storage unit included in the indoor unit. According to the modification example 1O, the user information database may alternatively be disposed on the server 80. In this case, the image recognizer 22 may be disposed in the first control unit 41 of the indoor unit 11, the user face information recognized at the image recognizer 22 may be transmitted to the server 80, and the user face information may be collated with the user information database on the server.

Still alternatively, as depicted in FIG. 12, the server 80 may include an image recognizer 22a as well as the user information database. In this case, the image of the user assumed to have acted may be transmitted from the air conditioner 10 to the server 80, and the image recognizer 22a disposed on the server 80 may determine whether or not the user in the image is registered as a user.

The embodiment of the present disclosure has been described above. Various modifications to modes and details should be available without departing from the object and the scope of the present disclosure recited in the claims.

The invention claimed is:

1. An air conditioning system comprising:
   an air conditioner including an indoor unit;
   a detector configured to detect a user action performed by a user toward the indoor unit;
   a control unit configured to recognize the user action and determine whether a terminal that is registered to the user or activated to a state capable of wireless communication is present; and
   a transmitter configured to transmit first information on the indoor unit to the terminal,
   the control unit being configured to cause the transmitter to transmit the first information to the terminal upon determining that the detector has detected the user action and the terminal is present.

2. The air conditioning system according to claim 1, wherein
   the first information includes information indicating an operating state of the indoor unit.

3. The air conditioning system according to claim 2, wherein
   the first information includes information for operation of the indoor unit.

4. The air conditioning system according to claim 2, wherein
   the detector includes
      a camera, and
      an image recognizer configured to recognize the user action in an image captured by the camera.

5. The air conditioning system according to claim 2, wherein
   the detector includes
      a sound collector, and
      a voice recognizer configured to recognize the user action in voice collected by the sound collector.

6. The air conditioning system according to claim 2, further comprising:
   a storage unit configured to store information on the terminal,
   the control unit being configured
      to extract terminals disposed around the indoor unit, and
      to cause the first information to be transmitted to the terminal stored by the storage unit of the terminals extracted.

7. The air conditioning system according to claim 1, wherein the first information includes information for operation of the indoor unit.

8. The air conditioning system according to claim 7, wherein
the detector includes
a camera, and
an image recognizer configured to recognize the user action in an image captured by the camera.

9. The air conditioning system according to claim 7, wherein
the detector includes
a sound collector, and
a voice recognizer configured to recognize the user action in voice collected by the sound collector.

10. The air conditioning system according to claim 7, further comprising:
a storage unit configured to store information on the terminal,
the control unit being configured
to extract terminals disposed around the indoor unit, and
to cause the first information to be transmitted to the terminal stored by the storage unit of the terminals extracted.

11. The air conditioning system according to claim 1, wherein
the detector includes
a camera, and
an image recognizer configured to recognize the user action in an image captured by the camera.

12. The air conditioning system according to claim 11, further comprising:
a storage unit configured to store a face image of the user in correspondence with the terminal,
the image recognizer being configured to recognize a face of the user in the image captured by the camera,
the control unit being configured to determine whether or not the face recognized by the image recognizer is stored in the storage unit, and
when the face recognized is stored in the storage unit, the control unit being configured
to specify the terminal corresponding to the face image, and
to cause the first information to be transmitted to the terminal thus specified.

13. The air conditioning system according to claim 11, wherein
the detector includes
a sound collector, and
a voice recognizer configured to recognize the user action in voice collected by the sound collector.

14. The air conditioning system according to claim 11, further comprising:
a storage unit configured to store information on the terminal,
the control unit being configured
to extract terminals disposed around the indoor unit, and
to cause the first information to be transmitted to the terminal stored by the storage unit of the terminals extracted.

15. The air conditioning system according to claim 1, wherein
the detector includes
a sound collector, and
a voice recognizer configured to recognize the user action in voice collected by the sound collector.

16. The air conditioning system according to claim 1, further comprising:
a storage unit configured to store information on the terminal,
the control unit being configured
to extract terminals disposed around the indoor unit, and
to cause the first information to be transmitted to the terminal stored by the storage unit of the terminals extracted.

17. The air conditioning system according to claim 1, wherein
the control unit is configured to cause
the transmitter to transmit the first information to the terminal, and
the first information on the indoor unit to be displayed on a display screen of the terminal.

18. The air conditioning system according to claim 17, further comprising:
a receiver configured
to receive information transmitted from the terminal, and
to receive operation information on the indoor unit input to the terminal,
the control unit being configured to control the indoor unit in accordance with the operation information received by the receiver.

19. The air conditioning system according to claim 1, wherein
the indoor unit includes a first indoor unit and a second indoor unit disposed in an identical room provided with the first indoor unit, and
the first information includes information on the first indoor unit and information on the second indoor unit.

20. An information providing method usable with an air conditioning system including an air conditioner having an indoor unit, a detector disposed adjacent to or in the indoor unit, a transmitter configured to transmit information, and a control unit configured to control the detector and the transmitter, the method comprising:
the detector contactlessly detecting a user action;
the controller recognizing the user action and determining whether a terminal that is registered to the user or activated to a state capable of wireless communication is present; and
the control unit causing the transmitter to transmit first information on the indoor unit to the terminal upon determining that the detector has detected the user action and the terminal is present.

* * * * *